United States Patent

Hirose et al.

[11] Patent Number: 6,022,647
[45] Date of Patent: Feb. 8, 2000

[54] METHOD FOR MAKING COLOR FILTER SUBSTRATE, COLOR FILTER SUBSTRATE PRODUCED BY THE METHOD, AND LIQUID CRYSTAL DEVICE USING THE SUBSTRATE

[75] Inventors: Masashi Hirose, Tokyo; Yasushi Takatori, Sagamihara; Katsuhiro Shirota, Kawasaki; Takeshi Miyazaki, Ebina; Akio Kashiwazaki, Yokohama; Koichiro Nakazawa, Tokyo, all of Japan

[73] Assignee: Canon Kabushiki Kaisha, Tokyo, Japan

[21] Appl. No.: 09/177,605

[22] Filed: Oct. 23, 1998

[30] Foreign Application Priority Data

Oct. 24, 1997 [JP] Japan ..................... 9-291864

[51] Int. Cl.$^7$ ............................ G02B 5/20; G02F 1/1335
[52] U.S. Cl. ................................ 430/7; 349/106; 427/162
[58] Field of Search .................... 430/7; 349/106; 347/106, 107; 429/511, 165, 162, 389.7

[56] References Cited

U.S. PATENT DOCUMENTS 5,817,441 10/1998 Iwata et al. ................................. 430/7

FOREIGN PATENT DOCUMENTS 6-347637 12/1994 Japan .

*Primary Examiner*—John A. McPherson
*Attorney, Agent, or Firm*—Fitzpatrick, Cella, Harper & Scinto

[57] ABSTRACT

A method for making a color filter substrate includes the steps of: forming barriers on a substrate; placing an ink having a surface tension of 20 to 60 dyne/cm onto regions between the barriers; and curing the ink to form color filters. The volume of the ink charged onto one region is three to ten times the volume of the region. A color filter substrate is produced by the above-mentioned method. A liquid crystal device includes a pair of substrates and a liquid crystal encapsulated between the pair of substrates, wherein one of the pair of substrate is the above-mentioned color filter substrate.

9 Claims, 3 Drawing Sheets

METHOD FOR MAKING COLOR FILTER SUBSTRATE, COLOR FILTER SUBSTRATE PRODUCED BY THE METHOD, AND LIQUID CRYSTAL DEVICE USING THE SUBSTRATE

BACKGROUND OF THE INVENTION

1. Field of the Invention

The present invention relates to a method for making a color filter substrate used in color televisions and personal computers, to a color filter substrate produced by the method, and to a liquid crystal device using the color filter substrate.

2. Description of the Related Art

Demand for liquid crystal displays and in particular color liquid crystal displays is increasing with the spread of personal computers, particularly portable personal computers. Cost reduction of liquid crystal displays is essential for further spread. In particular, the cost of color filters is a considerable percentage of the cost of liquid crystals and reduction of the cost would be desirable.

Various methods have been proposed for achieving this requirement while providing satisfactory color filter characteristics, as follows.

A first method is a pigment dispersion method. A photosensitive layer of a dispersed pigment is formed on a substrate and patterned to form a color pattern. These steps are repeated three times to form R, G, and B color filters.

A second method is a dying method. A water-soluble polymer layer is formed on a substrate and is patterned into a desired shape by a photolithographic process. The resulting pattern is dipped into a dye bath to color the pattern. These steps are repeated three times to form R, G, and B color filters.

A third method is an electrodeposition method. A transparent electrode is patterned into a substrate and is dipped into an electrodeposition solution containing a pigment, a resin, and an electrolytic solvent. These steps are repeated three times to form R, G, B color filters. The color filters are finally baked.

A fourth method is a printing method. A pigment is dispersed into a thermosetting resin and the dispersion is printed. These steps are repeated three times to form R, G, and B layers. The thermosetting resin is cured by heat to form color filters.

In the first to fourth methods, a protective film is generally formed on the color filter.

In these methods, the same steps must be repeated three times to form R, G, and B layers, resulting in an increase in process costs. Such an increase in steps results in a decrease in production yield. In the electrodeposition method, the shape of the formable pattern is limited and thus is not applicable to TFT liquid crystal devices. Since the printing method has low image resolution, it is not suitable for fine-pitch patterns.

Methods for making color filters which solve these problems are ink-jet methods as disclosed in Japanese Patent Laid-Open Nos. 59-75205, 63-235901, and 1-217302. These methods, however, are still unsatisfactory in view of practical use.

Particularly, in a conventional method for imparting an ink to an ink receptive layer having low heat and solvent resistance, the ITO forming step and the alignment film forming step have process restriction. Thus, highly reliable liquid crystal devices are formed with difficulty by this method. A method for solving such a problem is the formation of a color filter by placing a curable ink directly on a substrate. FIGS. 3A to 3D are cross-sectional views of steps in this method. With reference to FIG. 3A, barriers 2 are formed on a transparent substrate 1. A curable ink 4 is charged in regions surrounded with the barriers 2. With reference to FIG. 3B, the curable ink 4 is cured by light irradiation or heat treatment to form color filters 5. With reference to FIG. 3C, a protective layer 6 may be formed, if necessary.

All of the regions surrounded with the barriers 2 must be filled with the curable ink 4. The curable ink 4 generally has a curved surface in each region because of surface tension, as shown in FIG. 3b. The solvent in the ink is evaporated in the subsequent ink-drying step. The residual solid components including a coloring agent, a resin, and additives form a color filter composed of a cured colored composition by curing. The curvature of the ink surface changes with the evaporation of the solvent, and the final curvature determines the shape of the color filter surface. A large final curvature causes a large difference in thickness in the color filter in some cases. The uneven thickness in the color filter directly reflects an uneven color density of the color filter. Thus, the uneven thickness in the color filter must be suppressed as much as possible in order to maintain superior display characteristics.

SUMMARY OF THE INVENTION

Accordingly, it is an object of the present invention to provide a method for making a color filter substrate free of uneven color density by a simplified process with a high production yield.

It is another object of the present invention to provide a color filter substrate free of uneven color density produced by this method.

It is a further object of the present invention to provide a liquid crystal device having excellent color display characteristics using this color filter substrate.

An aspect of the present invention is a method for making a color filter substrate including the steps of: forming barriers onto a substrate; placing an ink having a surface tension of 20 to 60 dyne/cm onto regions between the barriers; and curing the ink to form color filters; wherein the volume of the ink charged onto one region is three to ten times the volume of the region.

Another aspect of the present invention is a color filter substrate produced by the above-mentioned method.

A further aspect of the present invention is a liquid crystal device including a pair of substrates and a liquid crystal encapsulated between the pair of substrates, wherein one of the pair of substrates is the above-mentioned color filter substrate.

In accordance with the present invention, a color filter substrate free of uneven density can be produced in a high production yield by a simplified process, and a highly reliable color liquid crystal device having excellent display characteristics can be produced at low production cost by using the color filter substrate.

Further objects, features and advantages of the present invention will become apparent from the following description of the preferred embodiments with reference to the attached drawings.

DESCRIPTION OF THE PREFERRED EMBODIMENTS

FIGS. 1A to 1D are schematic cross-sectional views showing steps in an embodiment of a method for making a color filter substrate of the present invention. As a transparent substrate 1 of the present invention, a glass substrate is generally used. Other materials having transparency and mechanical strength can also be used in the present invention.

Figure 1A:
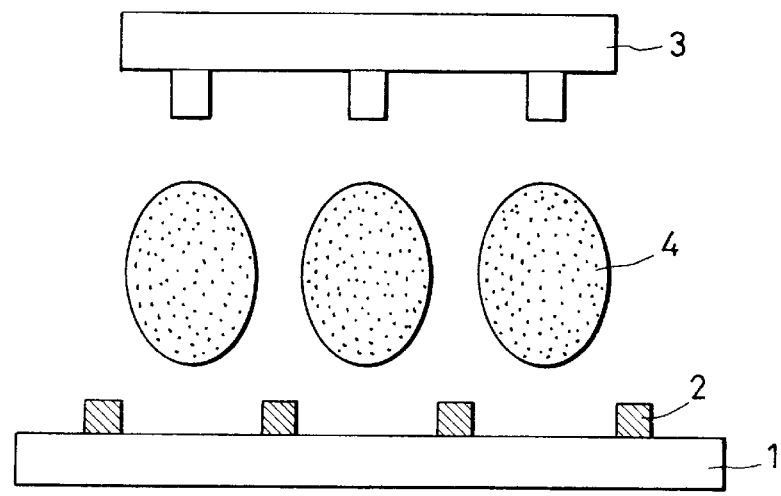
FIGS. 1A to 1D are schematic cross-sectional views showing steps in an embodiment of a method for making a color filter substrate of the present invention.

With reference to FIG. 1A, barriers 2 having ink-repellent characteristics are formed on the transparent substrate 1, and a curable ink 4 is charged onto the transparent substrate 1 using an ink-jet recording apparatus 3. The barriers 2 form dimples for receiving the curable ink 4 and prevent mixing of different colors which are charged onto adjacent color filters. The barriers 2 can be readily formed by, for example, patterning a photosensitive resist. A black matrix or black stripes may be used as the barriers 2. In such a case, a black resist may be patterned.

The barriers 2 may be formed directly on the transparent substrate 1. Alternatively, the barriers 2 may be formed on a substrate which is provided with another layer having other functions. A typical example of such a substrate is an active matrix substrate having a TFT array. The surface for forming a color filter may be pretreated in order to improve spreading of the curable ink.

The curable ink 4 is cured by light irradiation or heat treatment, or a combination thereof. The curable ink 4 has a surface tension of 20 to 60 dyne/cm, preferably 40 to 60 dyne/cm, and more preferably 50 to 60 dyne/cm in order to control the thickness of the color filter by the curable ink 4 to 0.2 $\mu$m or less. In the present invention, the surface tension is determined by the Wilhelmy method.

The curable ink 4 may be a solid or liquid ink as long as it satisfies the above-mentioned condition. The curable ink 4 may be a pigment-type or a dye-type. The curable ink 4 generally contains a resin component which is cured by light, heat, or a combination of light and heat; a coloring agent; an organic solvent; and water. The coloring agent may be a pigment or a dye. Examples of the preferred pigments include C.I. Pigment Red 177, C.I. Pigment Red 5, C.I. Pigment Red 12, C.I. Pigment Green 36, C.I. Pigment Blue 209, and C.I. Pigment Blue 16. Examples of the preferred dyes include C.I. Acid Red 118, C.I. Acid Red 254, C.I. Acid Green 25, C.I. Acid Blue 185, and C.I. Acid Blue 7. The preferable content of the coloring agent is 0.1 to 15 percent by weight to the ink.

Examples of the preferable curable resin component include acrylic resins, epoxy resins, and melamine resins. Other commercially available curable resins are also usable in the present invention. The preferable content of the resin component for achieving the above-mentioned surface tension is in a range of 0.1 to 15 percent by weight, and more preferably 5 to 10 percent by weight.

Examples of the organic solvents used in the present invention include alkylalcohols having 1 to 4 carbon atoms, e.g. methyl alcohol, ethyl alcohol, n-propyl alcohol, isopropyl alcohol, n-butyl alcohol, sec-butyl alcohol, and tert-butyl alcohol; amides, e.g. dimethylformamide and dimethylacetamide; ketones and ketone alcohols, e.g. acetone and diacetone alcohol; ethers tetrahydrofuran and dioxane; polyalkylene glycols, e.g. polyethylene glycol and polypropylene glycol; alkylene glycols with alkylene groups having 2 to 6 carbons, e.g. ethylene glycol, propylene glycol, butylene glycol, triethylene glycol, 1,2,6-hexane trial, thiodiglycol, hexylene glycol, and diethylene glycol; lower alkyl ethers of polyvalent alcohols, e.g. glycerin, ethylene glycol monomethyl (or monoethyl) ether, diethylene glycol methyl (or ethyl) ether, and triethylene glycol monomethyl (or monoethyl) ether; and miscellaneous solvents, e.g. N-methyl-2-pyrrolidone, 2-pyrrolidone and 1,3-dimethyl-2-imidazolidinone. The preferable content of the organic solvent in the ink is in a range of 5 to 50 percent by weight in view of initial discharge properties and discharge stability of the ink.

The volume of the curable ink 4 which is charged on the substrate 1 is in a range of 3 to 10 times and preferably 3 to 8 times the volume of the regions surrounded with the barriers 2. When the volume of the curable ink is 8 times or less the volume of the regions, the difference in thickness of the color filter can be controlled to be 0.1 $\mu$m or less. When the volume of the curable ink is greater than 10 times the volume of the regions, the difference in thickness of the color filter is higher than 0.2 $\mu$m, resulting in undesirable unevenness in density. When the volume of the curable ink is less than 3 times the volume of the regions, a required thickness is not obtained.

Figure 1B:
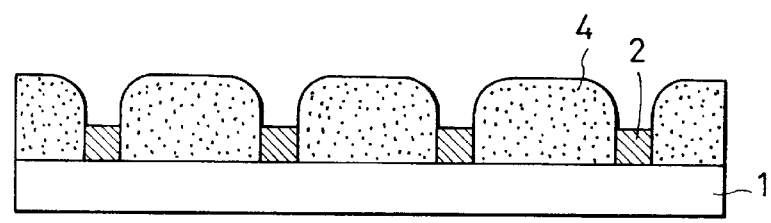
Figure 1C:
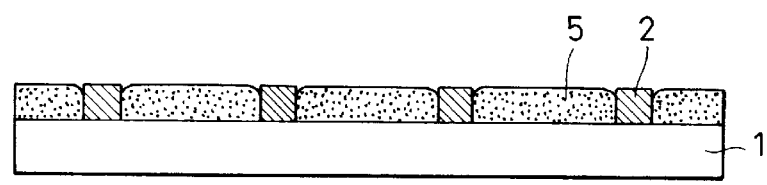
Figure 1D:
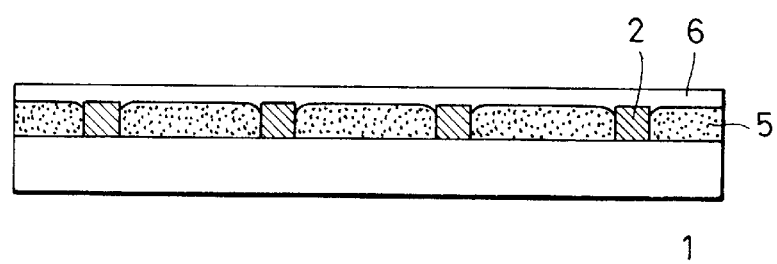

After charging the curable ink 4 onto the regions between the barriers 2 as shown in FIG. 1B, the ink is dried, if necessary, and then cured by light irradiation or heat treatment or by a combination thereof. Color filters 5 are thereby formed between the barriers 2 on the substrate 1 as shown in FIG. 1C.

A protective film 6 is formed on the color filters 5, if necessary. The protective film 6 may be a resinous film which is curable by light, heat or a combination thereof, or an organic film which is formed by vapor deposition or sputtering. The protective film 6 must have transparency and durability in the subsequent processes, for example, an ITO film forming process and an alignment film forming process for production of liquid crystal devices.

Figure 2:
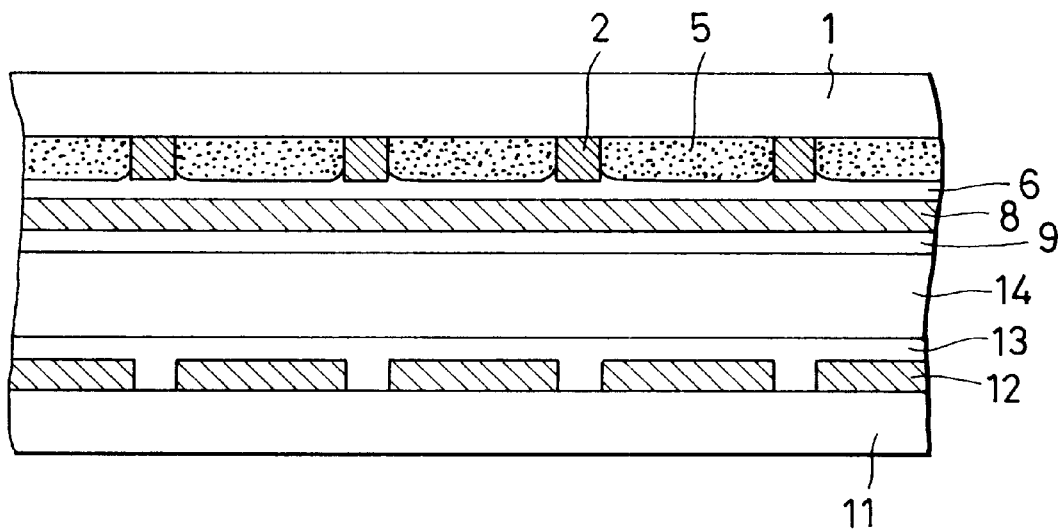
FIG. 2 is a schematic cross-sectional view of an embodiment of a liquid crystal device of the present invention.
Figure 3A:
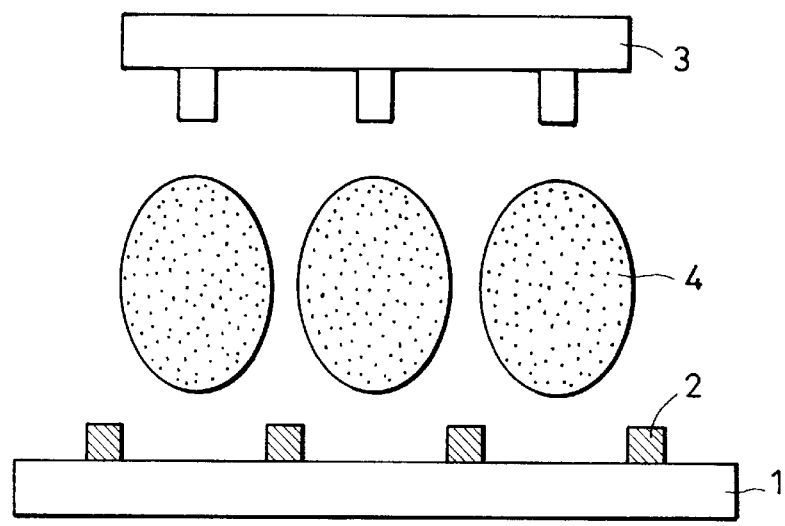
FIGS. 3A to 3D are schematic cross-sectional views of steps in a conventional process for making a color filter substrate.
Figure 3B:
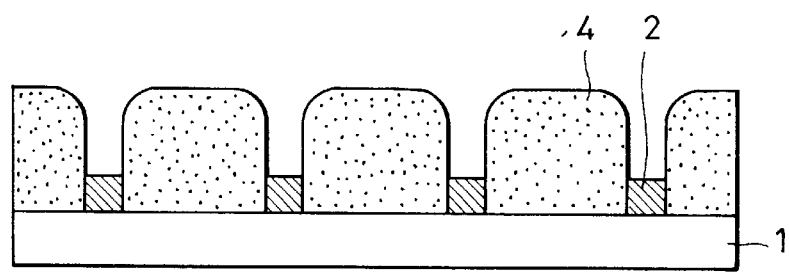
Figure 3C:
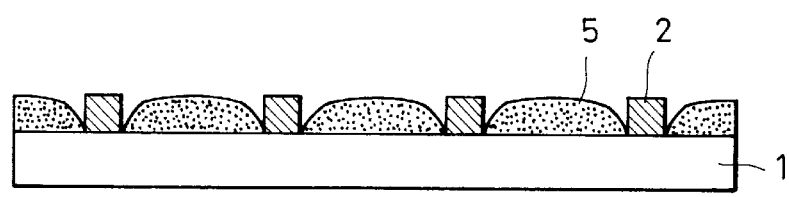
Figure 3D:
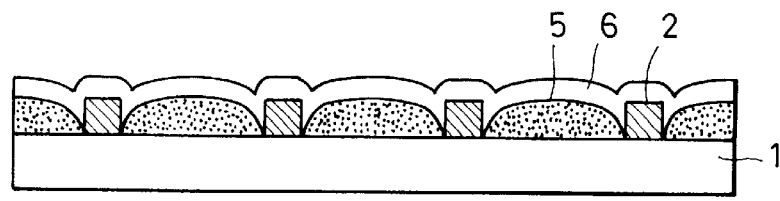

FIG. 2 is a schematic cross-sectional view of an embodiment of a liquid crystal device using the color filter substrate which is produced as described above. The liquid crystal device comprises a substrate 1 having color filters 5, a common electrode 8, an alignment film 9, a counter substrate 11, an alignment film 13, and a liquid crystal compound 14. The gap between the substrate 1 and the counter substrate 11 is approximately 2 to 5 $\mu$m.

The liquid crystal device in this embodiment is an active-matrix-type color liquid crystal device using TFTs, and is produced by encapsulating the liquid crystal compound 14 between the substrate 1 with the color filter 5 and the counter substrate 11. A matrix of TFTs (not shown in the drawing) and pixel electrodes are formed on the counter substrate 11, whereas color filters 5 are formed on the substrate 1 so as to face the corresponding pixel electrodes 12, and the transparent common electrode 8 is placed on the inner face of the substrate 1. The alignment films 9 and 13 are formed on the inner faces of the substrate 1 and the counter substrate 11, respectively. The alignment films 9 and 13 are subjected to rubbing treatment so that the liquid crystal molecules are oriented in a given direction.

Polarizers are bonded to the outer faces of the substrate 1 and the counter substrate 11. The polarizers function as light shutters in the display, which vary transmittance of the light from a back light including a fluorescent light and a scattering plate Conventional parts and processes other than described above can be applied to the present invention.

EXAMPLE 1

A black matrix was formed on a glass substrate by lithography using a black resist CK-S171B made by Fuji-Hunt Electronics Technology Co., Ltd. Each opening in the black matrix had dimensions of 70 µm by 220 µm, and a depth of 1 µm. The total volume of the regions for charging curable ink, therefore, was 15,400 µm³. Thus, the 8-times and 10-times volumes of the total volume are 123,000 µm³ and 154,000 µm³.

Using an ink-jet recording apparatus, 12,000 µm³ (120 pl) of curable ink was charged onto each opening in the black matrix. The curable ink contains a dye, a water-soluble organic solvent, water, a resin composition composed of a binary copolymer of N-methylolacrylamide and methyl methacrylate, and a surfactant for adjusting the surface tension. The resin and dye contents were 5 percent by weight and 5 percent by weight, respectively, and the surface tension was adjusted to 60 dyne/cm.

C.I. Acid Red 158 was used as a red dye. C.I. Direct Blue (DBL) 86 modified with C.I. Acid Yellow (AY) 23 was used as a green dye. DBL 86 modified with C.I. Acid Red (AR) 289 was used as a blue dye.

The water-soluble organic solvent contains 20 percent by weight of ethylene glycol and an adequate amount of thiodiglycol. The surface tension of each color ink was adjusted to be 60 dyne/cm by adjusting the thiodiglycol content. The surface tension was determined by an automatic surface tension meter CBVP-Z made by Kyowa Interface Science Co., Ltd.

All curable color inks were satisfactorily discharged from the ink-jet recording apparatus. The charged ink was cured by heat treatment at 200° C. for 1 hour.

The surface thickness of the resulting color filter substrate was determined by a surface roughness meter P10 made by Tencall. The average thickness of the color filter was 0.6 µm and a difference in the thickness was 0.1 µm or less. Color mixing or density unevenness was not observed.

A color liquid crystal device was produced by a series of steps for forming a protective film on the color filter substrate, an ITO electrode, and then an alignment film, and encapsulating a liquid crystal compound. The liquid crystal device was continuously driven for 1,000 hours in a temperature range of −20° C. to 60° C. No problems during display were observed.

EXAMPLE 2

A color filter substrate was produced as in Example 1 using a ternary copolymer of N-methylolacrylamide, methyl mathacrylate, and hydroxyethyl methacrylate instead of the binary copolymer in Example 1 as the resin component in the curable ink. The surface tension of each curable color ink was adjusted to be 60 dyne/cm by adjusting the thiodiglycol content.

The curable color inks were satisfactorily discharged from the ink-jet recording apparatus. The average thickness of the color filter was 0.6 µm and a difference in the thickness was 0.1 µm or less. Color mixing or density unevenness was not observed.

A color liquid crystal device was produced as in Example 1 using the color filter substrate. The liquid crystal device was continuously driven for 1,000 hours in a temperature range of −20° C. to 60° C. No problems during display were observed.

EXAMPLE 3

A color filter substrate was produced as in Example 1 except that the thiodiglycol content was modified so that the surface tension of each curable color ink was 50 dyne/cm.

The curable color inks were satisfactorily discharged from the ink-jet recording apparatus. The average thickness of the color filter was 0.6 µm and a difference in the thickness was 0.1 µm or less. Color mixing or density unevenness was not observed.

A color liquid crystal device was produced as in Example 1 using the color filter substrate. The liquid crystal device was continuously driven for 1,000 hours in a temperature range of −20° C. to 60° C. No problems during display were observed.

EXAMPLE 4

A color filter substrate was produced as in Example 1 except that the resin and dye contents in each curable color ink were 7 percent by weight and 3 percent by weight, respectively. The surface tension of each curable color ink was 50 dyne/cm.

The curable color inks were satisfactorily discharged from the ink-jet recording apparatus. The average thickness of the color filter was 0.8 µm and a difference in the thickness was 0.2 µm or less. Color mixing or density unevenness was not observed.

A color liquid crystal device was produced as in Example 1 using the color filter substrate. The liquid crystal device was continuously driven for 1,000 hours in a temperature range of −20° C. to 60° C. No problems during display were observed.

EXAMPLE 5

A color filter substrate was produced as in Example 1 except that the charged volume of each curable color ink was 150,000 µm³.

The average thickness of the color filter was 0.6 µm and a difference in the thickness was 0.19 µm or less. Color mixing or density unevenness was not observed.

A color liquid crystal device was produced as in Example 1 using the color filter substrate. The liquid crystal device was continuously driven for 1,000 hours in a temperature range of −20° C. to 60° C. No problems during display were observed.

EXAMPLE 6

A photoresist (commercial name: OFPR-800 made by Tokyo Ohka Kogyo Co., Ltd.) was coated onto a glass substrate film so that the thickness of the photoresist layer was 1 µm and barriers were formed by patterning the photoresist layer by photolithography. A color filter substrate was produced as in Example 1 using the glass substrate.

The average thickness of the color filter was 0.6 µm and a difference in the thickness was 0.1 µm or less. Color mixing or density unevenness was not observed.

Using a counter substrate in which a resin black matrix was formed on a TFT array, a color liquid crystal device was produced by a series of steps for forming an ITO layer and then an alignment film, and encapsulating a liquid crystal compound. The color liquid crystal device was continuously driven for 1,000 hours in a temperature range of −20° C. to 60° C. No problems during display were observed.

EXAMPLE 7

A color filter substrate was produced as in Example 1 except that a black matrix as barriers was formed an a substrate with a TFT array formed thereon by photolithography using a black resist CK-S171B made by Fuji-Hunt Electronics Technology Co., Ltd.

The average thickness of the color filter was 0.8 μm and a difference in the thickness was 0.2 μm or less. Color mixing or density unevenness was not observed.

Using a transparent glass substrate as a counter substrate, a color liquid crystal device was produced by a series of steps for forming an ITO layer and then an alignment film, and encapsulating a liquid crystal compound. The color liquid crystal device was continuously driven for 1,000 hours in a temperature range of −20° C. to 60° C. No problems during display were observed.

Comparative Example 1

A color filter substrate was produced as in Example 1 except that the charged volume of each curable color ink was 190,000 μm³ (190 pl). The average thickness of the color filter was 1.0 μm and a difference in the thickness was 0.3 to 0.45 μm or less.

Comparative Example 2

A color filter substrate was produced as in Example 1 except that the surface tension of each curable color ink was 15 dyne/cm. The average thickness of the color filter was 1.0 μm and a difference in the thickness was 0.25 μm or less.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for making a color filter substrate comprising the steps of: forming barriers on a substrate; placing an ink having a surface tension of 20 to 60 dyne/cm onto regions between the barriers; and curing the ink to form color filters; wherein the volume of the ink charged onto one region is three to ten times the volume of the region.

2. A method for making a color filter substrate according to claim 1, wherein the surface tension is in a range of 40 to 60 dyne/cm.

3. A method for making a color filter substrate according to claim 1, the surface tension is in a range of 50 to 60 dyne/cm.

4. A method for making a color filter substrate according to claim 1, wherein the ink contains 0.1 to 15 percent by weight of a resin component to the ink.

5. A method for making a color filter substrate according to claim 1, wherein the ink contains 5 to 15 percent by weight of a resin component to the ink.

6. A method for making a color filter substrate according to claim 1, wherein the volume of the ink charged onto one region is three to eight times the volume of the region.

7. A method for making a color filter substrate according to claim 1, wherein the substrate is an active matrix substrate comprising an TFT array, and the barriers comprises a black matrix formed by patterning a black resist.

8. A color filter substrate produced by a method according to any one of claims 1 to 7.

9. A liquid crystal device comprising a pair of substrates and a liquid crystal encapsulated between the pair of substrates, wherein one of the pair of substrates is a color filter substrate according to claim 8.

* * * * *

UNITED STATES PATENT AND TRADEMARK OFFICE
CERTIFICATE OF CORRECTION

PATENT NO.   : 6,022,647
DATED        : February 8, 2000
INVENTOR(S)  : MASASHI HIROSE ET AL.

It is certified that error appears in the above-identified patent and that said Letters Patent is hereby corrected as shown below:

COLUMN 4

Line 67, plate" should read --plate.--.

COLUMN 6

Line 67, "an a" should read --on a--.

COLUMN 8

Line 26, "an" should read --a--; and "comprises" should read --comprise--.

Signed and Sealed this

Twentieth Day of February, 2001

Attest:

NICHOLAS P. GODICI

*Attesting Officer*   Acting Director of the United States Patent and Trademark Office